(12) United States Patent
Li (10) Patent No.: US 12,192,604 B2
(45) Date of Patent: Jan. 7, 2025

(54) REPLACEABLE GIMBAL CAMERA, AIRCRAFT, AIRCRAFT SYSTEM, AND GIMBAL REPLACEMENT METHOD FOR AIRCRAFT

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 308 days.

(21) Appl. No.: 17/660,255

(22) Filed: Apr. 22, 2022

(65) Prior Publication Data

US 2022/0247898 A1 Aug. 4, 2022

Related U.S. Application Data

(63) Continuation of application No. PCT/CN2020/123319, filed on Oct. 23, 2020.

(30) Foreign Application Priority Data

Oct. 24, 2019 (CN) .......................... 201911018698.9

(51) Int. Cl.
*H04N 23/54* (2023.01)
*B64D 47/08* (2006.01)
(Continued)

(52) U.S. Cl.
CPC ............. *H04N 23/54* (2023.01); *B64D 47/08* (2013.01); *B64U 10/14* (2023.01); *G02B 13/14* (2013.01);
(Continued)

(58) Field of Classification Search
None
See application file for complete search history.

(56) References Cited

U.S. PATENT DOCUMENTS 9,280,038 B1 * 3/2016 Pan .......................... A45F 5/10
10,315,781 B2 * 6/2019 Zhao ..................... G03B 15/006
(Continued)

FOREIGN PATENT DOCUMENTS

CA 3082511 A1 * 5/2019 ........... B64C 39/024
CA 3107526 A1 * 3/2020 ......... G06F 3/04842
(Continued)

OTHER PUBLICATIONS

Supplementary European Search Report EP20878602.0 mailed Nov. 25, 2022.
(Continued)

*Primary Examiner* — Ricky Chin (57) ABSTRACT

The embodiments are a replaceable gimbal camera, an aircraft, an aircraft system, and a gimbal replacement method for an aircraft. The replaceable gimbal camera is applied to the aircraft. The aircraft is provided with a fuselage and a gimbal. The replaceable gimbal camera includes an image capture module, a static storage module, and an image processing module. The static storage module is configured to store parameter data. The image processing module is configured to read the parameter data stored in the static storage module, where after the gimbal is replaced, the image processing module is configured to read parameter data of a gimbal after replacement and configure corresponding parameter data for an image capture module of the gimbal after replacement.

18 Claims, 7 Drawing Sheets

(51) Int. Cl.
*B64U 10/14* (2023.01)
*B64U 101/30* (2023.01)
*G02B 13/14* (2006.01)
*G03B 15/00* (2021.01)
*G03B 17/56* (2021.01)
*H04N 5/77* (2006.01)
*H04N 5/907* (2006.01)
*H04N 7/015* (2006.01)
*H04N 7/18* (2006.01)
*H04N 23/55* (2023.01)
*H04N 23/66* (2023.01)
*H04N 23/67* (2023.01)

(52) U.S. Cl.
CPC ......... *G03B 15/006* (2013.01); *G03B 17/561* (2013.01); *H04N 5/77* (2013.01); *H04N 5/907* (2013.01); *H04N 7/015* (2013.01); *H04N 7/183* (2013.01); *H04N 23/55* (2023.01); *H04N 23/66* (2023.01); *H04N 23/67* (2023.01); *B64U 2101/30* (2023.01)

(56) References Cited

U.S. PATENT DOCUMENTS

| | | | | |
|---|---|---|---|---|
| 11,363,195 | B2 * | 6/2022 | Honjo | H04N 23/667 |
| 11,538,348 | B1 * | 12/2022 | Tooker | G08G 5/0026 |
| 2014/0132787 | A1 * | 5/2014 | Lin | G06F 3/0346 |
| | | | | 348/211.99 |
| 2015/0365220 | A1 * | 12/2015 | Sultenfuss | H04L 5/0096 |
| | | | | 370/536 |
| 2016/0352992 | A1 * | 12/2016 | Saika | H04N 23/685 |
| 2017/0126969 | A1 * | 5/2017 | Lee | H04N 1/00244 |
| 2017/0138534 | A1 * | 5/2017 | Chen | F16M 13/00 |
| 2018/0024570 | A1 * | 1/2018 | Hutson | F16M 11/18 |
| | | | | 701/4 |
| 2018/0067493 | A1 * | 3/2018 | Pilskalns | B64U 20/87 |
| 2018/0113462 | A1 * | 4/2018 | Fenn | F16M 13/00 |
| 2018/0267561 | A1 * | 9/2018 | Trench | G05D 1/102 |
| 2018/0274720 | A1 * | 9/2018 | Gubler | H04N 23/667 |
| 2019/0215451 | A1 * | 7/2019 | Enke | G03B 17/56 |
| 2019/0349533 | A1 * | 11/2019 | Guo | G06F 3/16 |
| 2020/0104598 | A1 * | 4/2020 | Qian | G06V 20/20 |
| 2020/0154054 | A1 * | 5/2020 | Tsukamoto | H04N 23/63 |
| 2021/0029401 | A1 * | 1/2021 | Levkovich | H04N 21/6547 |
| 2022/0247898 | A1 * | 8/2022 | Li | B64U 10/14 |
| 2022/0264007 | A1 * | 8/2022 | Pilskalns | G08G 5/0069 |

FOREIGN PATENT DOCUMENTS

| | | | | | |
|---|---|---|---|---|---|
| CA | 3065993 | A1 | * | 6/2020 | ......... A47G 29/1251 |
| CA | 3114527 | A1 | * | 2/2022 | ......... G06Q 10/0833 |
| CN | 103581546 | A | | 2/2014 | |
| CN | 206162501 | U | | 5/2017 | |
| CN | 106814742 | A | | 6/2017 | |
| CN | 107256037 | A | | 10/2017 | |
| CN | 107621828 | A | * | 1/2018 | |
| CN | 207340042 | U | | 5/2018 | |
| CN | 207367004 | U | | 5/2018 | |
| CN | 108401495 | A | | 8/2018 | |
| CN | 108769531 | A | | 11/2018 | |
| CN | 109155819 | A | | 1/2019 | |
| CN | 208412168 | U | | 1/2019 | |
| CN | 110083180 | A | | 8/2019 | |
| CN | 110730287 | A | | 1/2020 | |
| CN | 211855357 | U | * | 11/2020 | |
| WO | WO2019/000842 | A1 | | 1/2019 | |

OTHER PUBLICATIONS

PCT International Search Report mailed Jan. 27, 2021; PCT/CN2020/123319 with English Translation.

\* cited by examiner

REPLACEABLE GIMBAL CAMERA, AIRCRAFT, AIRCRAFT SYSTEM, AND GIMBAL REPLACEMENT METHOD FOR AIRCRAFT

CROSS-REFERENCE TO RELATED APPLICATIONS

The present application is a continuation of International Application No. PCT/CN2020/123319, filed on Oct. 23, 2020, which claims priority to Chinese patent application No. 201911018698.9, filed on Oct. 24, 2019, which is incorporated herein by reference in its entirety.

TECHNICAL FIELD

The present invention relates to the field of aircraft technologies, and in particular, to a replaceable gimbal camera, an aircraft, an aircraft system, and a gimbal replacement method for an aircraft.

BACKGROUND

Aircrafts, such as an unmanned aerial vehicle (UAV), are widely applied due to advantages of small size, light weight, flexible maneuverability, quick response, unmanned operation, low operation requirements and the like. The various actions (or attitudes) of the UAV are usually implemented by controlling different rotational speeds of a plurality of drive motors in a power system of the UAV. A gimbal camera is generally installed on the UAV to capture images or videos.

Some aerial photography users intend to capture large-scale high-resolution images, some intend to capture professional and delicate images, some intend to capture images with good night scene effects, and some intend to capture infrared thermal images. At present, no replaceable gimbal camera is available on the market of consumer UAVs for aerial photography. Therefore, users need to purchase different types of UAVs to meet the needs of different scenarios.

Thus, there is an urgent need for a replaceable gimbal camera.

SUMMARY

Embodiments of the present invention provide a replaceable gimbal camera, an aircraft, an aircraft system, and a gimbal replacement method for an aircraft. The costs can be reduced for a user by matching one aircraft with a plurality of replaceable gimbal cameras. In addition, parameter data is stored in the gimbal camera, so that the parameter data can be quickly read for configuration after gimbal replacement, so that the aircraft is adapted to parameters of different gimbal cameras, to meet the shooting needs of different scenarios.

To resolve the above technical problems, the embodiments of the present invention provide the following technical solutions.

According to a first aspect, an embodiment of the present invention provides a replaceable gimbal camera, applicable to an aircraft, where the aircraft is provided with a fuselage and a gimbal, the gimbal is a replaceable gimbal, and the gimbal camera includes:

an image capture module, disposed on the gimbal and configured to capture an image;

a static storage module, configured to store parameter data; and an image processing module, disposed on the fuselage, communicatively connected to the static storage module, and configured to read the parameter data stored in the static storage module, where after the gimbal is replaced, the image processing module is configured to read parameter data of a gimbal after replacement and configure corresponding parameter data for an image capture module of the gimbal after replacement.

In some embodiments, the image capture module includes:

a lens, disposed on the gimbal and configured to obtain an original image; and an image sensor, disposed on the gimbal, connected to the lens, and configured to convert the original image captured by the lens into a digital image signal.

In some embodiments, the parameter data is compressed into a gimbal parameter file, the gimbal parameter file is stored in the static storage module, and the image processing module is configured to read the parameter data in the gimbal parameter file by decompressing the gimbal parameter file.

In some embodiments, the static storage module is disposed on the gimbal, and each replaceable gimbal is provided with a static storage module configured to store parameter data, so that the gimbal camera reads the parameter data from the static storage module of the gimbal.

In some embodiments, the gimbal camera is provided with a mobile industry processor interface (MIPI), an I2C bus interface, a first serial port, a second serial port, a scalable low voltage signaling embedded clock (SLVS-EC) serial interface, and a universal serial bus (USB) interface, and each gimbal includes an MIPI, an I2C bus interface, a first serial port, a second serial port, an SLVS-EC serial interface, and a USB interface.

In some embodiments, the replaceable gimbal includes an 8K gimbal, an 8K lens, and an 8K sensor, where the 8K lens and the 8K sensor are disposed on the 8K gimbal, the 8K sensor is communicatively connected to the image processing module through an MIPI line, and the gimbal camera controls an automatic focus of the 8K lens and an exposure of the 8K sensor through the I2C bus interface.

In some embodiments, the replaceable gimbal includes a dual-light gimbal, an 8K visible light lens, an 8K visible light sensor, an infrared thermal imaging lens, and an infrared thermal imaging sensor, where the 8K visible light lens, the 8K visible light sensor, the infrared thermal imaging lens, and the infrared thermal imaging sensor are disposed on the dual-light gimbal, the infrared thermal imaging sensor is communicatively connected to the image processing module through a USB data line, and the gimbal camera controls a parameter of the infrared thermal imaging sensor through a second serial port line.

In some embodiments, the replaceable gimbal includes a one-inch gimbal, a one-inch lens, and a one-inch sensor, where the one-inch lens and the one-inch sensor are disposed on the one-inch gimbal, the one-inch sensor is communicatively connected to the image processing module through an SLVS-EC serial bus, the gimbal camera controls an automatic focus and an automatic aperture of the one-inch lens through a second serial port line, and the gimbal camera controls movement of the one-inch gimbal through a first serial port line.

In some embodiments, the gimbal camera further includes:

an encoding module, disposed on the fuselage, connected to the image processing module, and configured to encode the image captured by the image capture module to generate an encoded image;

a photographing and recording module, disposed on the fuselage and configured to take a picture and/or a video; and an image transmission module, disposed on the fuselage and configured to transmit the encoded image to an image receiving terminal.

In some embodiments, the parameter data includes: a model of the gimbal camera, an image resolution, a frame rate, an image quality parameter, and a calibration parameter.

According to a second aspect, an embodiment of the present invention provides an aircraft, including:

the gimbal camera;

a fuselage;

a replaceable gimbal, connected to the fuselage;

an arm, connected to the fuselage;

a power apparatus, disposed on the fuselage and/or the arm and configured to provide flight power for the aircraft; and a flight controller, disposed on the fuselage.

According to a third aspect, an embodiment of the present invention provides an aircraft system, including:

the aircraft, where the aircraft includes a plurality of replaceable gimbals;

a server, configured to store parameter data of the plurality of replaceable gimbals; and an image receiving terminal, configured to receive an image sent by the image transmission module.

According to a fourth aspect, an embodiment of the present invention provides a gimbal replacement method for an aircraft, applicable to the aircraft system, the method including:

pre-storing parameter data of a gimbal camera through each replaceable gimbal;

obtaining, after the gimbal is replaced, parameter data of a gimbal currently installed on the aircraft; and configuring the parameter data for a lens and an image sensor of the aircraft.

In some embodiments, the method further includes:

compressing the parameter data of the gimbal camera into a gimbal parameter file; and sending the gimbal parameter file to the gimbal after replacement, so that the gimbal parameter file is stored in a static storage module of the replaceable gimbal.

In some embodiments, the method further includes:

sending the parameter data of the gimbal camera to the server, so that the server stores the parameter data of the gimbal camera.

According to a fifth aspect, an embodiment of the present invention provides a non-volatile computer-readable storage medium, the computer-readable storage medium storing computer executable instructions, the computer executable instructions, when executed by an aircraft, causing the aircraft to perform the gimbal replacement method for an aircraft.

The present invention provides a replaceable gimbal camera, applicable to an aircraft, where the aircraft is provided with a fuselage and a gimbal, the gimbal is a replaceable gimbal, and the gimbal camera includes: an image capture module, configured to capture an image; a static storage module, configured to store parameter data, where the parameter data includes a model of the gimbal camera, an image resolution, a frame rate, an image quality parameter, and a calibration parameter; and an image processing module, disposed on the fuselage, communicatively connected to the static storage module, and configured to read the parameter data stored in the static storage module, where after the gimbal is replaced, the image processing module is configured to read parameter data of a gimbal after replacement and configure corresponding parameter data for an image capture module of the gimbal after replacement. The costs can be reduced for a user by matching one aircraft with a plurality of replaceable gimbal cameras. In addition, the parameter data is stored in the gimbal camera, so that the parameter data can be quickly read for configuration after gimbal replacement, so that the aircraft is adapted to parameters of different gimbal cameras, to meet the shooting needs of different scenarios.

BRIEF DESCRIPTION OF THE DRAWINGS

One or more embodiments are exemplarily described with reference to the corresponding figures in the accompanying drawings, and the exemplary descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

To make the objectives, technical solutions, and advantages of the embodiments of the present invention clearer, the technical solutions in the embodiments of the present invention are clearly and completely described with reference to the accompanying drawings in the embodiments of the present invention. Apparently, the described embodiments are merely some embodiments of the present application rather than all of the embodiments. Based on the embodiments of the present invention, all other embodiments obtained by a person of ordinary skill in the art without creative efforts shall fall within the protection scope of the present invention.

In addition, technical features involved in implementations of the present invention that are described below may be combined with each other provided that no conflict occurs.

A replaceable gimbal camera provided in the embodiments of the present invention may be applied to various movable objects, including but not limited to, an aircraft, a robot and the like driven by motors. The aircraft may include a UAV, an unmanned spacecraft and the like.

Figure 1:
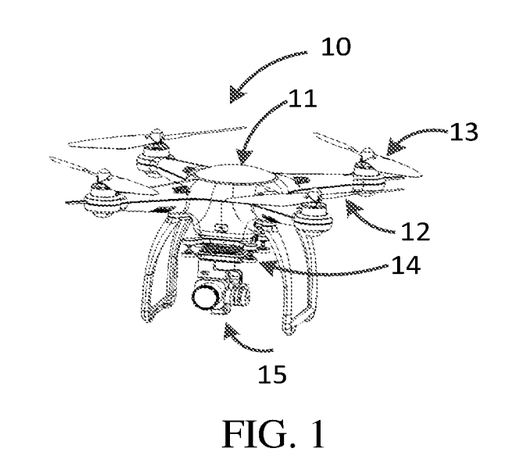
FIG. 1 is a schematic structural diagram of an aircraft according to an embodiment of the present invention.

FIG. 1 is a schematic structural diagram of an aircraft according to an embodiment of the present invention.

As shown in FIG. 1, the aircraft 10 includes a fuselage 11, an arm 12 connected to the fuselage 11, a power apparatus 13 disposed on the arm 12, a gimbal 14 connected to a bottom portion of the fuselage 11, a photographing assembly 15 mounted on the gimbal 14, and a flight controller (not shown in the figure) disposed in the fuselage 11.

The flight controller is connected to the power apparatus 13, and the power apparatus 13 is mounted on the fuselage 11 and is configured to provide flight power for the aircraft 10.

The fuselage 11 includes a central housing and one or more arms connected to the central housing, and the one or more arms extend radially from the central housing. The arm and the central housing may be integrally connected or fixedly connection. The power apparatus is mounted on the arm.

The flight controller is configured to generate a control instruction, and send the control instruction to an electronic speed controller of the power apparatus, so that the electronic speed controller controls a drive motor of the power apparatus through the control instruction. The controller is a device with a specific logic processing capability, such as a control chip, a single-chip microcomputer and a microcontroller unit (MCU).

The power apparatus 13 includes an electronic speed controller, a drive motor, and a propeller. The electronic speed controller is located on the arm or in a cavity formed by the central housing. The electronic speed controller is connected to the controller and the drive motor. Specifically, the electronic speed controller is electrically connected to the drive motor and is configured to control the drive motor. The drive motor is mounted on the arm, and a rotating shaft of the drive motor is connected to the propeller. The propeller, driven by the drive motor, generates a force that moves the aircraft 10, for example, a lift or thrust that moves the aircraft 10.

Specified speeds and actions (or attitudes) completed by the aircraft 10 are realized by the electronic speed controller controlling the drive motor. The electronic speed controller adjusts a rotational speed of the drive motor of the aircraft 10 according to a control signal. The electronic speed controller controls the drive motor based on the following principle: The drive motor is an open-loop control element that converts an electric pulse signal into an angular displacement or a linear displacement. In a case of non-overload, the rotational speed and a stop position of the drive motor merely depend on a frequency and a quantity of pulses of a pulse signal, and are not affected by load changes. When receiving a pulse signal, a driver drives the drive motor of the power apparatus to rotate by a fixed angle in a specified direction, and the rotation of the power apparatus runs at a fixed angle. Therefore, the electronic speed controller may control an angular displacement by controlling the quantity of pulses, to implement accurate positioning; and control the rotational speed and an acceleration of the drive motor by controlling a pulse frequency, to implement speed regulation.

At present, the aircraft 10 mainly achieves functions such as aerial photography, real-time image transmission, and detection of high-risk areas. To implement functions such as aerial photography, real-time image transmission, and detection of high-risk areas, a photographing assembly is connected to the aircraft 10. Specifically, the aircraft 10 and the photographing assembly 15 are connected through a connecting structure, such as a vibration reduction ball. The photographing assembly 15 is configured to obtain a captured picture during the aerial photography of the aircraft 10.

Specifically, the photographing assembly 15 includes a gimbal and a photographing apparatus. The gimbal is connected to the aircraft 10. The photographing apparatus is carried on the gimbal. The photographing apparatus may be an image capture apparatus for capturing an image. The photographing apparatus includes, but is not limited to, a camera, a video camera, a lens, a scanner, a camera phone or the like. The gimbal is configured to carry the photographing apparatus, to fix the photographing apparatus, or freely adjust an attitude of the photographing apparatus (for example, change a height, an inclination, and/or a direction of the photographing apparatus), and keep the photographing apparatus stable in a specified attitude. For example, when the aircraft 10 performs aerial photography, the gimbal is mainly configured to keep the photographing apparatus stable in a specified attitude, to prevent the photographing apparatus from shaking when capturing a picture, and ensure the stability of the captured picture.

The gimbal 14 is connected to the flight controller, to implement data exchange between the gimbal 14 and the flight controller. The gimbal 14 includes: a gimbal motor and a gimbal base. The gimbal motor is mounted on the gimbal base. The flight controller may further control the gimbal motor by using the electronic speed controller of the power apparatus 13. Specifically, the flight controller is connected to the electronic speed controller, and the electronic speed controller is electrically connected to the gimbal motor; the flight controller generates a gimbal motor control instruction, and the electronic speed controller controls the gimbal motor through the gimbal motor control instruction.

The gimbal base is connected to the fuselage of the aircraft and is configured to fix the photographing assembly 15 on the fuselage of the aircraft.

The gimbal motor is connected to the gimbal base and the photographing apparatus. The gimbal may be a multi-shaft gimbal. Correspondingly, a plurality of gimbal motors are provided, that is, each shaft is provided with a gimbal motor. In one aspect, the gimbal motor may drive the photographing apparatus to rotate, to adjust horizontal rotation and a pitch angle of a photographing shaft, and the gimbal motor is rotated by manual remote control or the motor is automatically rotated by using a program, to implement all-round scanning and monitoring. In another aspect, during the aerial photography of the aircraft, interference to the photographing apparatus is offset in real time by the rotation of the gimbal motor, preventing the photographing apparatus from shaking, and ensuring the stability of the captured picture.

The photographing apparatus is carried on the gimbal. An inertial measurement unit (IMU) is disposed on the photographing apparatus. The IMU is an apparatus for measuring a three-axis attitude angle (or angular rate) and an acceleration of an object. Generally, one IMU is equipped with a three-axis gyroscope and a three-direction accelerometer to measure an angular velocity and an acceleration of an object in a three-dimensional space, and calculate an attitude of the object based on the angular velocity and the acceleration. To improve reliability, each shaft may be equipped with more sensors. Generally, the IMU is mounted at the center of gravity of the aircraft.

In addition, one or more functional modules may further be added to the UAV to enable the UAV to implement more functions such as aerial photography and mapping.

For example, in some embodiments, the UAV includes at least one image capture apparatus for capturing images, to obtain an original image by using the image capture apparatus. In some other embodiments, the UAV may further provide a fixing support for fixedly mounting the image capture apparatus, to allow a user to change the image capture apparatus mounted on the UAV as required.

In some embodiments, the UAV may further include a storage space. The storage space is configured to store the original image, to facilitate subsequent invoking of the original image when needed. The storage space may be a built-in or external storage space of the UAV. For example, the UAV is provided with an external SD card interface, and a memory device such as an SD card can be inserted into the interface to store the obtained original image. In addition, several consecutive frames of original images form a video or a recording. In some embodiments, the video or the recording formed by the consecutive frames of original images may further be stored in the built-in or external storage space of the UAV.

In addition, the UAV further includes at least one image processing module and an image transmission module. The image processing module is configured to process the original image captured by the image capture apparatus, and send a processed image to an image receiving terminal by using the image transmission module, to implement real-time image transmission.

In some embodiments, the image capture apparatus, the image processing module, and the image transmission module may be integrated into an assembly of the UAV, for example, integrated into a photographing assembly of the UAV. The photographing assembly may be used as an image sending terminal, to transmit a captured image to the image receiving terminal through the image sending terminal in real time.

The image receiving terminal may be any type of user interaction device. The image receiving terminal may be equipped with one or more different user interaction devices, to acquire a user instruction or present or feed back information to the user. The user interaction devices include, but are not limited to, a button, a display screen, a touchscreen, a speaker, and a remote control joystick. For example, the image receiving terminal may be equipped with a touch display screen, and receive a touch instruction of the user through the touch display screen and present information, for example, present an image to the user through the touch display screen.

In some embodiments, the image receiving terminal may be a smart terminal device such as a mobile phone, a tablet computer, a personal computer, a wearable device or the like. The image receiving terminal may be equipped with a software application (APP) matching the UAV. The user may use the software APP to display a received image sent by the UAV on the touch display screen.

In some other embodiments, the image receiving terminal may further be a dedicated control device matching the UAV, for example, a remote control of the UAV. The image receiving terminal may receive an image from the UAV and display the image through a built-in or externally-connected display screen.

It may be understood that names of various components of the UAV are merely used for identification, and should not be construed as a limitation to the embodiments of the present invention. In addition, the image transmission method provided in the embodiments of the present invention may be further extended to other suitable application environments, but is not limited to the application environment shown in FIG. 1. In an actual application process, the application environment may further include more image receiving terminals.

Figure 2:
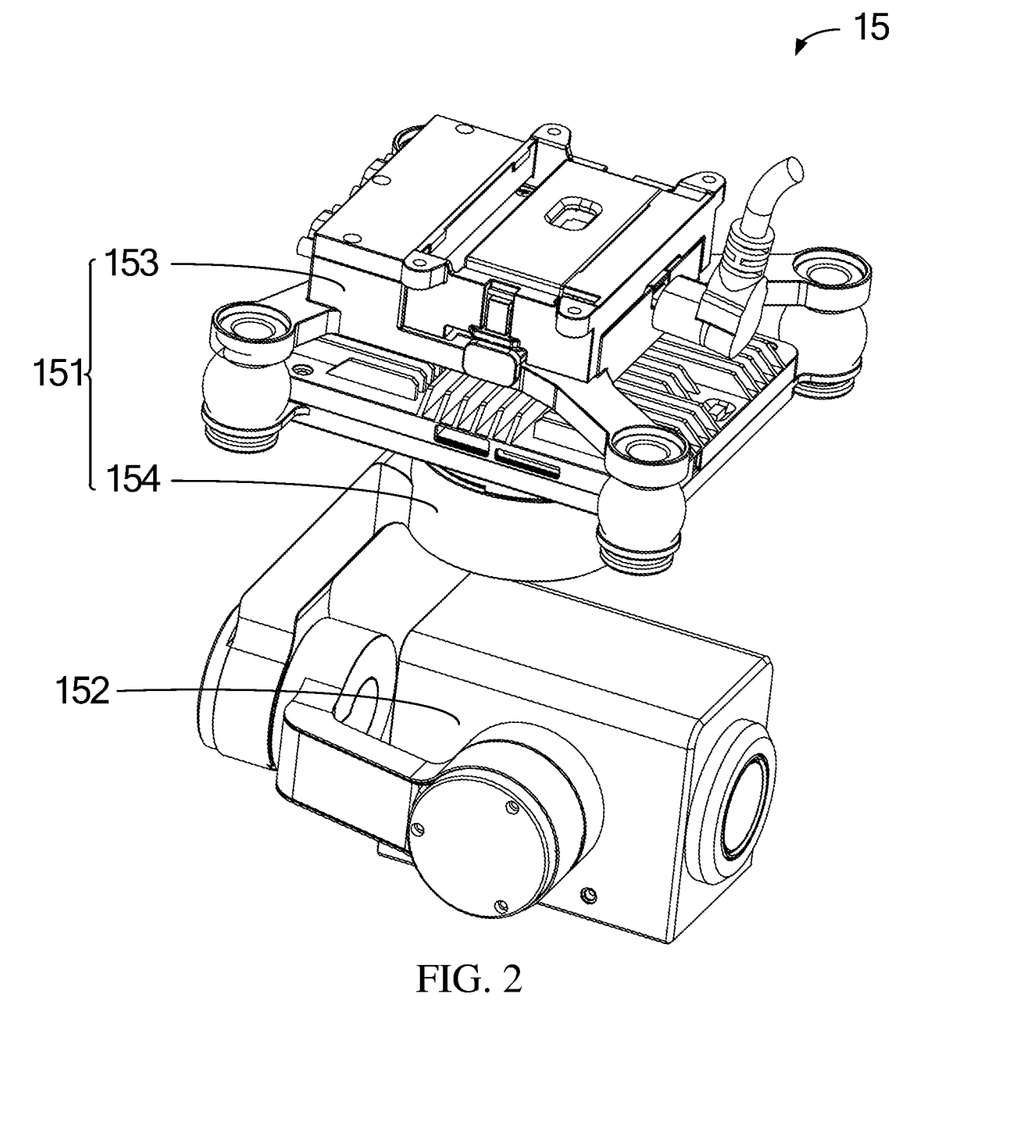
FIG. 2 is a three-dimensional diagram of a photographing assembly according to an embodiment of the present invention.
Figure 3:
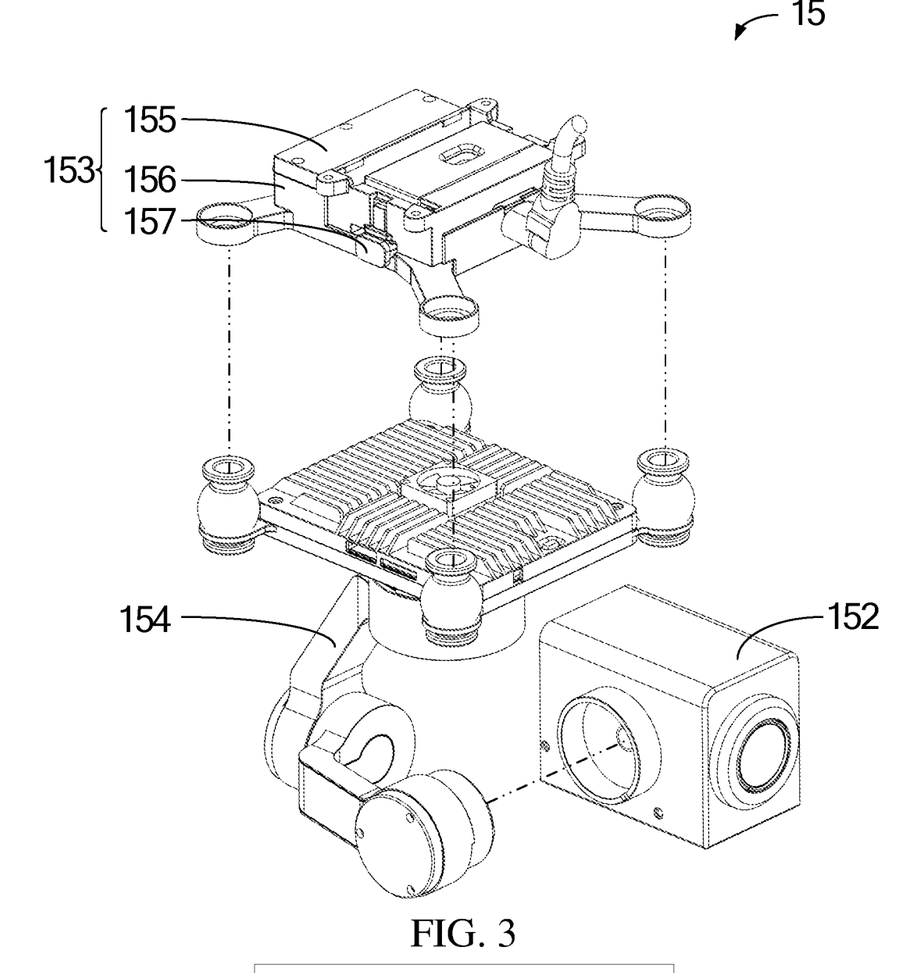
FIG. 3 is an exploded view of the photographing assembly shown in FIG. 2.

FIG. 2 and FIG. 3 show a photographing assembly 15 according to one of the embodiments of the present invention. The photographing assembly 15 is disposed on the aircraft 10 shown in FIG. 1. The aircraft 10 may be used as an auxiliary apparatus for photography, detection, and sampling, and the aircraft 10 may be a UVA, an unmanned spacecraft, an unmanned vehicle or the like.

The photographing assembly 15 includes a gimbal assembly 151 and a photographing apparatus 152 disposed on the gimbal assembly 151. The photographing apparatus 152 is configured to perform photography, detection, sampling and the like. The photographing apparatus 152 may be a video camera, a camera, an infrared sensor or the like.

The gimbal assembly 152 includes a quick release component 153 and a gimbal body 154 disposed on the quick release component 153. The gimbal body 154 is disposed on the UVA through the quick release component 153. The gimbal body 154 is configured to fix the photographing apparatus 152 and freely adjust an attribute of the photographing apparatus 152, for example, change a height, an inclination and a direction of the photographing apparatus 152.

The photographing apparatus 152 in this embodiment of the present invention is a replaceable gimbal camera. Because each gimbal camera has a different image resolution, frame rate, image quality parameter and calibration parameter, how to ensure that a camera can load correct parameters after the gimbal camera is replaced is a problem to be resolved in the present invention.

Therefore, based on the foregoing problem, the embodiments of the present invention mainly intend to provide a replaceable gimbal camera.

Figure 4:
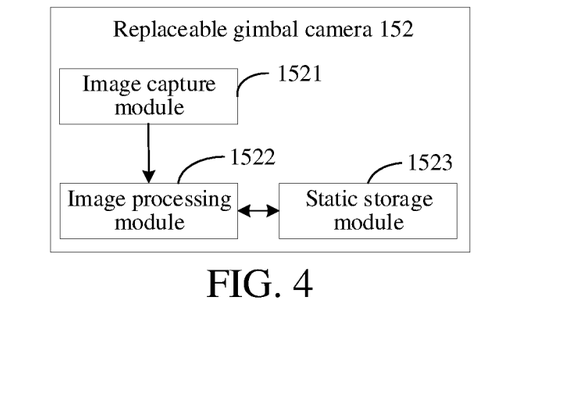
FIG. 4 is a schematic structural diagram of a replaceable gimbal camera according to an embodiment of the present invention.

FIG. 4 is a schematic structural diagram of a replaceable gimbal camera according to an embodiment of the present invention.

As shown in FIG. 4, a replaceable gimbal camera 152 is applied to an aircraft. The aircraft is provided with a fuselage and a gimbal, and the gimbal is a replaceable gimbal. The gimbal camera 152 includes an image capture module 1521, an image processing module 1522 and a static storage module 1523. The image processing module 1522 is communicatively connected to the image capture module 1521 and the static storage module 1523.

Specifically, the image capture module 1521 is communicatively connected to the image processing module 1522, and is configured to capture an image and send the captured image to the image processing module 1522.

In this embodiment of the present invention, the image capture module 1521 includes:

a lens, disposed on the gimbal and configured to obtain an original image; and an image sensor, disposed on the gimbal, connected to the lens, and configured to convert the original image captured by the lens into a digital image signal.

In this embodiment of the present invention, the lens includes an 8K lens, an 8K visible light lens, a one-inch large lens or the like, and the image sensor includes a sensor such as an 8K sensor, an 8K visible light sensor, an infrared thermal imaging sensor or the like.

The image sensor sends the digital image signal to the image processing module 1522, so that the image processing module 1522 receives the digital image signal and processes the digital image signal, for example, performs ISP processing.

Specifically, the image processing module 1522 is connected to the image capture module 1521 and is configured to receive the image captured by the image capture module 1521, and perform ISP processing such as image denoising, enhancement, and color restoration on the captured image. The image processing module 1522 is disposed on the fuselage of the aircraft, is further communicatively connected to the static storage module 1523, and is configured to read parameter data stored in the static storage module 1523. In addition, after the gimbal is replaced, the image processing module 1522 is configured to read parameter data of a gimbal after replacement and configure corresponding parameter data for an image capture module of the gimbal after replacement. In this embodiment of the present invention, the image processing module 1522 is a graphics processing unit.

Specifically, the static storage module 1523 is disposed on the gimbal, that is, each replaceable gimbal is provided with the static storage module 1523. Each replaceable gimbal includes one static storage module 1523 configured to store the parameter data of the image capture module, such as a model of the gimbal camera, an image resolution, a frame rate, an image quality parameter, and a calibration parameter. The static storage module 1523 is communicatively connected to the image processing module 1522, and the image processing module 1522 is configured to read the parameter data such as a model of the gimbal camera, an image resolution, a frame rate, an image quality parameter and a calibration parameter stored in the static storage module 1523, to configure corresponding parameters for the gimbal camera.

In this embodiment of the present invention, the static storage module 1523 may be a static memory (random access memory (RAM)), for example, a static random access memory (SRAM) or a dynamic random access memory (DRAM).

Figure 5:
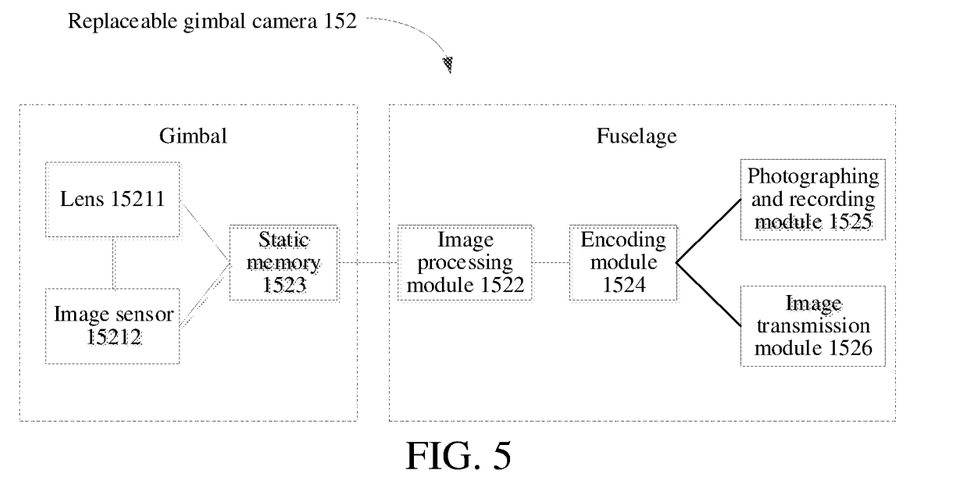
FIG. 5 is a schematic structural diagram of another replaceable gimbal camera according to an embodiment of the present invention.

FIG. 5 is a schematic structural diagram of another replaceable gimbal camera according to an embodiment of the present invention.

As shown in FIG. 5, a replaceable gimbal camera 152 includes a lens 15211, an image sensor 15212, and a lens memory 1523. The lens 15211, the image sensor 15212, and the lens memory 1523 are all disposed on a gimbal. The gimbal is a replaceable gimbal. The replaceable gimbal camera 152 further includes an image processing module 1522, an encoding module 1524, a photographing and recording module 1525, and an image transmission module 1526. The image processing module 1522, the encoding module 1524, the photographing and recording module 1525, and the image transmission module 1526 are all disposed on a fuselage of an aircraft.

The lens 15211 has different sizes and resolutions. A size of a lens is generally a size of an image sensor matching the lens, and the size of the image sensor is a length of a diagonal. A common image shows a maximum range of the image sensor. During selection of a lens, a nominal size needs to be greater than or equal to the size of the image sensor; otherwise, vignetting occurs. A resolution of a lens refers to a quantity of black and white line pairs that can be resolved within a 1 mm interval on an imaging plane, and a unit of the resolution is "line pairs/mm" (lp/mm). In this embodiment of the present invention, the lens includes an 8K lens, an 8K visible light lens, a one-inch lens or the like. Different lenses are used to meet requirements of different scenarios. For example, the 8K lens is used for shooting ordinary natural scenes, the 8K visible light lens is used for night vision detection shooting, and the one-inch lens is used for professional shooting.

The image sensor 15212 is formed by many photosensitive elements, and each element is referred to as a pixel. A quantity of pixels has great impact on image quality. More pixels indicate that details are displayed more clearly and an image has higher resolution. The quantity of pixels is a main performance indicator of the image sensor, which determines a resolution of a displayed image. A higher resolution indicates that details of an image are displayed more clearly. In this embodiment of the present invention, the image sensor 15212 includes an 8K sensor, an 8K visible light sensor, a one-inch sensor or the like. The 8K sensor is used in coordination with the 8K lens to shoot the ordinary natural scenes. The 8K visible light sensor is used in coordination with the 8K visible light lens to implement night vision detection shooting, and the one-inch sensor is used in coordination with the one-inch lens to implement professional shooting.

It may be understood that this embodiment of the present invention may further include other cameras and image transmission sensors, which is not limited herein.

The encoding module 1524 is disposed on the fuselage, connected to the image processing module 1522, and configured to encode the image captured by the image capture module, to generate an encoded image. The encoding module 1524 is further connected to the photographing and recording module 1525 and the image transmission module 1526. The encoding module 1524 is further configured to send the encoded image to the photographing and recording module 1525 and the image transmission module 1526, so that the photographing and recording module 1525 generates corresponding image data or video data according to the encoded image, or the image transmission module 1526 transmits the encoded image to an image receiving terminal. In this embodiment of the present invention, the encoding module 1524 includes, but is not limited to, an encoder.

The photographing and recording module 1525 is connected to the encoding module 1524 and is configured to process the encoded image sent by the encoding module 1524, to generate the image data or the video data. In this embodiment of the present invention, the photographing and recording module 1525 includes a photographing module and a recording module, which are respectively used for a photographing function and a recording function.

The image transmission module 1526 is disposed on the fuselage, connected to the encoding module 1524, and configured to transmit the encoded image sent by the encoding module 1524 to the image receiving terminal, so that the image receiving terminal receives the encoded image.

Figure 6:
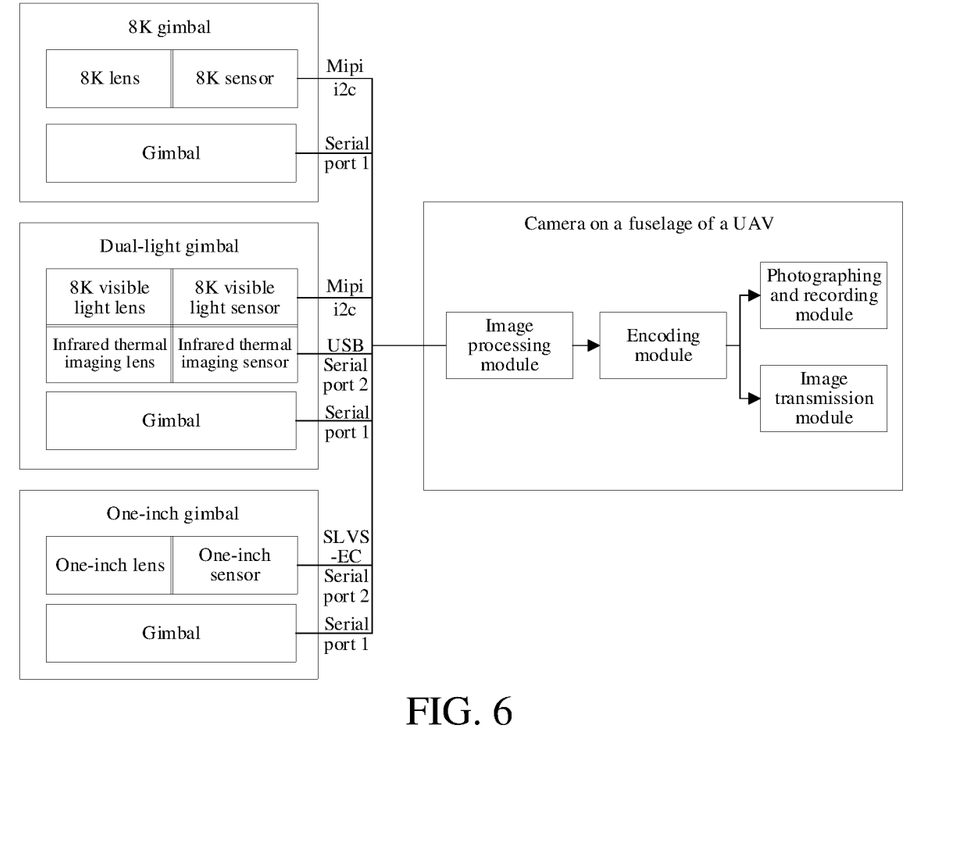
FIG. 6 is a schematic structural diagram of still another replaceable gimbal camera according to an embodiment of the present invention.
Figure 7:
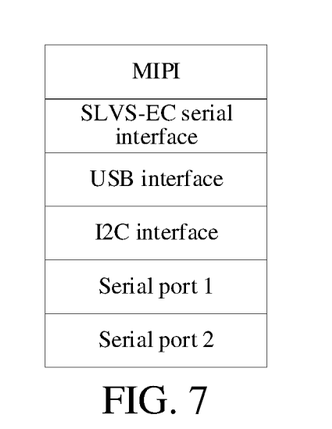
FIG. 7 is a schematic diagram of an interface according to an embodiment of the present invention.

Referring to FIG. 6 and FIG. 7, FIG. 6 is a schematic structural diagram of still another replaceable gimbal camera according to an embodiment of the present invention, and FIG. 7 is a schematic diagram of an interface according to an embodiment of the present invention.

As shown in FIG. 7, the gimbal camera is provided with an MIPI, an SLVS-EC serial interface, an I2C bus interface, a first serial port, a second serial port and a USB interface.

Each gimbal includes an MIPI, an I2C bus interface, a first serial port, a second serial port, an SLVS-EC serial interface and a USB interface. The gimbal camera and the gimbal communicate with each other through the MIPI of the gimbal camera and the MIPI of the gimbal.

The MIPI is used as an open standard for mobile application processors initiated by the MIPI Alliance, which intends to standardize internal interfaces of mobile phones, such as a camera, a display interface, and a radio frequency/baseband interface. There are different workgroups under the MIPI Alliance, which respectively define a series of standards for internal interfaces of mobile phones, and specifications of the standards are constantly revised and improved. Currently, mature interface applications include a display interface (DSI) and a camera interface (CSI). The CSI/DSI carries an application for a camera or display, and has a complex protocol structure.

The SLVS-EC serial interface is a serial bus developed by Sony this year. Each channel of the SLVS-EC serial interface has an independent hour hand. A bandwidth of a single channel is 2.3 Gbps, which is much higher than that of the MIPI of 1.44 Gbps or the SLVS of 0.576 Gbps. However, the IMX410 does not adopt the stacking technology and has low resolution. Therefore, Sony's camera department may launch a "new entry" full-frame mirrorless camera.

An I2C bus is a simple, bidirectional two-line synchronous serial bus developed by Philips. The I2C bus needs only two lines to transmit information between devices connected to the bus. A master device is a device for starting the bus to transmit data and generating a clock to open transmission. In this case, any addressed device is considered to be a slave device. A relationship between master and slave and a relationship between sending and receiving on the bus are not fixed, but depend on a direction of data transmission in this case. If a host intends to send data to the slave device, the host first addresses the slave device, then actively sends data to the slave device, and finally terminates data transmission. If the host intends to receive data from the slave device, the host first addresses the slave device, then receives data sent by the slave device, and finally terminates the receiving process. In such case, the host is responsible for generating a timing clock and terminating data transmission.

The USB interface is used by a master controller to manage data transfer, power transfer, signal transfer and the like between the host and a USB device. In this embodiment of the present invention, the USB interface includes a USB Type-A interface, a USB Type-B interface, a USB Type-C interface or the like.

The first serial port and the second serial port are both serial communication interfaces on a single-chip microcontroller, corresponding to a serial port 1 and a serial port 2 respectively. The gimbal camera is provided with a first serial port and a second serial port. In addition, each gimbal includes a first serial port and a second serial port. The first serial port of the gimbal camera and the first serial port of the gimbal communicate with each other through a first serial port line, and the second serial port of the gimbal camera and the second serial port of the gimbal communicate with each other through a second serial port line.

As shown in FIG. 6, an 8K lens and an 8K sensor are mounted on the 8K gimbal. The 8K sensor transmits image data to an image processing module of a camera on a fuselage of a UVA through an MIPI line, to implement a communication connection between the 8K sensor and the image processing module. The camera on the fuselage of the UVA controls an automatic focus of the 8K lens and an exposure of the 8K sensor through an I2C bus.

An 8K visible light lens, an 8K visible light sensor, an infrared thermal imaging lens, and an infrared thermal imaging sensor are mounted on a dual-light gimbal. The 8K visible light sensor transmits image data to an image processing module of a camera on a fuselage of a UVA through an MIPI line, to implement a communication connection between the 8K visible light sensor and the image processing module. The camera on the fuselage of the UVA controls an automatic focus of the 8K visible light lens and an exposure of the 8K visible light sensor through an I2C bus. In addition, the infrared thermal imaging sensor transmits image data to the image processing module of the camera on the fuselage of the UVA through a USB data line, to implement a communication connection between the infrared thermal imaging sensor and the image processing module. The camera on the fuselage of the UVA controls movement of the gimbal through the first serial port, and controls parameters such as an image resolution, an image quality parameter and a calibration parameter of the infrared thermal imaging sensor through the second serial port (serial port 2).

A one-inch lens and a one-inch sensor are mounted on the one-inch gimbal. The one-inch sensor transmits image data to an image processing module of a camera on a fuselage of a UVA through an SLVS-EC serial interface. The camera on the fuselage of the UVA controls an automatic focus and an automatic aperture of the one-inch lens through the second serial port (serial port 2). In addition, the camera on the fuselage of the UVA controls movement of the gimbal through the first serial port (serial port 1).

It may be understood that, to achieve a degree of detachability of the gimbal, lines between the camera on the fuselage of the UVA and the gimbal need to match all interfaces of the 8K gimbal, the dual-light gimbal, and the one-inch gimbal, that is, the gimbal camera is provided with the MIPI, the I2C bus interface, the first serial port, the second serial port, the SLVS-EC serial interface, and the USB interface; each gimbal includes the MIPI, the inter-integrated circuit bus interface, the first serial port, the second serial port, the SLVS-EC serial interface, and the USB interface. When each replaceable gimbal is connected to the fuselage of the UAV, interfaces are defined to be consistent, and interfaces not in use are reserved.

A resolution, a frame rate, and an image format of each gimbal camera are inconsistent, even gimbal cameras of the same model have different image quality parameters and calibration parameters. Moreover, traditional gimbal cameras are often not replaceable, and various parameter data is stored in a flash memory of the camera on the fuselage of the UAV. As a result, when the user changes the gimbal, if the parameter data are still stored in the camera on the fuselage of the UAV, recalibration needs to be performed and parameters need to be remodified. The operation process is cumbersome, and a specific amount of time is wasted, which does not meet the requirements of the user.

Figure 8:
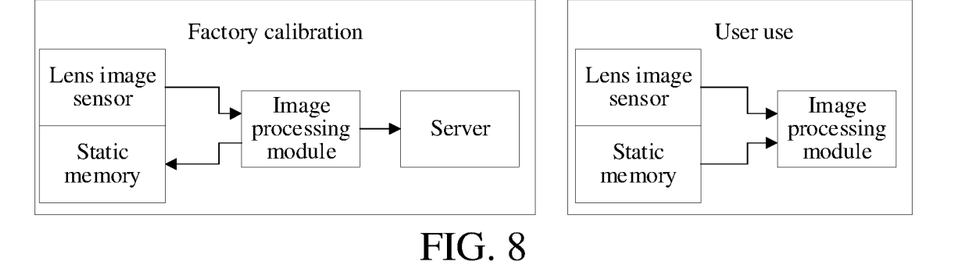
FIG. 8 is a schematic diagram of factory calibration and user use according to an embodiment of the present invention.

FIG. 8 is a schematic diagram of factory calibration and user use according to an embodiment of the present invention.

As shown in FIG. 8, during factory calibration, an image processing module for calibrating a gimbal camera obtains an image parameter from a lens and an image sensor, then performs calibration to obtain a calibration parameter, and compresses parameter data such as a current calibration parameter, an image quality parameter, and a sensor model into a compressed file with a serial number name of a gimbal, and stores the compressed file to a static memory. By compressing the parameter data, the parameter data file occupies less memory, which is conducive to quick storage. The calibration parameter is obtained through a calibration process, and the calibration parameter is stored in the gimbal. Specifically, the calibration parameter is stored in a static memory of the gimbal. When needed by the user, the calibration parameter is obtained from the static memory of the gimbal through the image processing module, and is then loaded into the lens and image sensor of the gimbal camera.

In this embodiment of the present invention, the compressed file with the serial number name of the gimbal is also stored in a server, so that a developer can find corresponding parameters from the server according to a serial number of the gimbal, re-store the compressed file, or locate an image problem in a case that the gimbal camera needs to be repaired or an image of the gimbal camera needs to be found. Specifically, if a problem occurs in an image, a corresponding model is obtained through the server according to the serial number of the gimbal, and a corresponding calibration parameter is searched for according to the model, so as to locate the image problem.

When the user uses the gimbal camera, every time the gimbal camera is powered on, the image processing module of the gimbal camera reads the compressed file from the static memory, then decompresses the compressed file to obtain parameters of the lens and image sensor of the gimbal camera, and then configures the parameters for the current lens and image sensor of the gimbal camera. By storing parameter data of the lens and the image sensor of the gimbal camera to the static memory of the gimbal, regardless of how the gimbal camera is detached and replaced, the gimbal camera can be adapted to different lenses and image sensors, so as to meet the requirements of gimbal replacement.

In this embodiment of the present invention, a replaceable gimbal camera is provided, including an image capture module, a static storage module and an image processing module. The static storage module is configured to store parameter data. The image processing module is configured to read the parameter data stored in the static storage module, where after the gimbal is replaced, the image processing module is configured to read parameter data of a gimbal after replacement and configure corresponding parameter data for an image capture module of the gimbal after replacement. The costs can be reduced for a user by matching one aircraft with a plurality of replaceable gimbal cameras. In addition, the parameter data is stored in the gimbal camera, so that the parameter data can be quickly read for configuration after gimbal replacement, so that the aircraft is adapted to parameters of different gimbal cameras, to meet the shooting needs of different scenarios.

Figure 9:
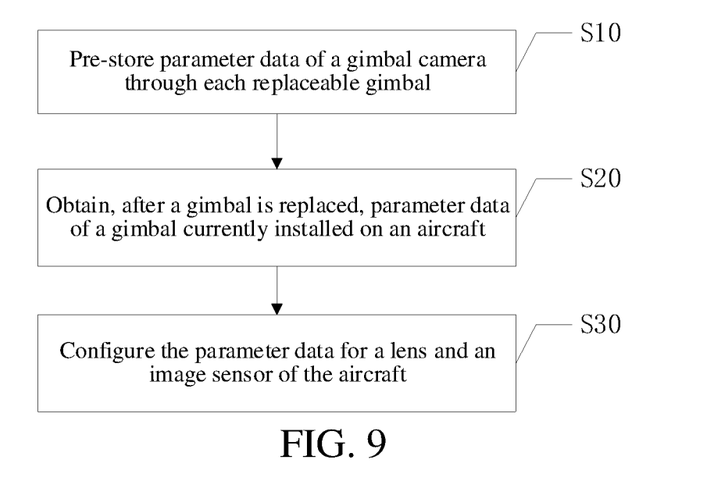
FIG. 9 is a schematic flowchart of a gimbal replacement method for an aircraft according to an embodiment of the present invention.

FIG. 9 is a schematic flowchart of a gimbal replacement method for an aircraft according to an embodiment of the present invention.

The gimbal replacement method for an aircraft provided in this embodiment of the present invention is applicable to various movable objects, including but not limited to, an aircraft, a robot and the like driven by motors. The aircraft may include a UAV, an unmanned spacecraft and the like. The gimbal replacement method for an aircraft provided in this embodiment of the present invention is applied to a flight controller of the aircraft, that is, an execution entity of the gimbal replacement method for an aircraft is the flight controller.

As shown in FIG. 9, the gimbal replacement method for an aircraft includes the following steps.

Step S10. Pre-store parameter data of a gimbal camera through each replaceable gimbal.

Specifically, the parameter data of the gimbal camera includes a model of the gimbal camera, an image resolution, a frame rate, an image quality parameter, and a calibration parameter. The gimbal includes a static memory, and the parameter data of the gimbal camera is stored in the static memory of the gimbal.

In this embodiment of the present invention, the method further includes:

compressing the parameter data of the gimbal camera into a gimbal parameter file; and sending the gimbal parameter file to the replaceable gimbal, so that the gimbal parameter file is stored in the static storage module of the replaceable gimbal.

Specifically, by compressing the parameter data, a parameter data file occupies less memory space, which is conducive to quick storage.

Step S20. Obtain, after the gimbal is replaced, parameter data of a gimbal currently installed on the aircraft.

Specifically, after the gimbal of the aircraft is replaced, the flight controller obtains parameter data of a gimbal currently installed on the aircraft. Specifically, the parameter data of the gimbal currently installed on the aircraft, such as a model of the gimbal camera, an image resolution, a frame rate, an image quality parameter, and a calibration parameter, is obtained by using the static memory of the gimbal.

Step S30. Configure the parameter data for a lens and an image sensor of the aircraft.

Specifically, according to the obtained parameter data stored in the static memory of the gimbal, the parameter data such as the image resolution, the frame rate, the image quality parameter or the calibration parameter is configured for the lens and the image sensor of the aircraft.

In this embodiment of the present invention, the method further includes:

sending the parameter data of the gimbal camera to the server, so that the server stores the parameter data of the gimbal camera.

The aircraft is communicatively connected to the server, and the aircraft sends the parameter data of the gimbal camera to the server. Specifically, the parameter data of the gimbal camera is compressed into the gimbal parameter file. The aircraft sends the gimbal parameter file to the server, so that the server stores the gimbal parameter file. By storing the parameter data of the gimbal camera to the server, a developer can find corresponding parameters from the server according to a serial number of the gimbal, re-store the compressed file, or locate an image problem when the gimbal camera needs to be repaired or an image of the gimbal camera needs to be searched for. Specifically, if a problem occurs in an image, a corresponding model is obtained through the server according to the serial number of the gimbal, and a corresponding calibration parameter is searched for according to the model, so as to locate the image problem.

In this embodiment of the present invention, a gimbal replacement method for an aircraft is provided, applicable to an aircraft system, the method including: pre-storing parameter data of a gimbal camera through each replaceable gimbal; obtaining, after the gimbal is replaced, parameter data of a gimbal currently installed on the aircraft; and configuring the parameter data for a lens and an image sensor of the aircraft. The parameter data is stored in the gimbal camera, so that the parameter data can be quickly read for configuration after gimbal replacement, so that the aircraft is adapted to parameters of different gimbal cameras, to meet the shooting needs of different scenarios.

Figure 10:
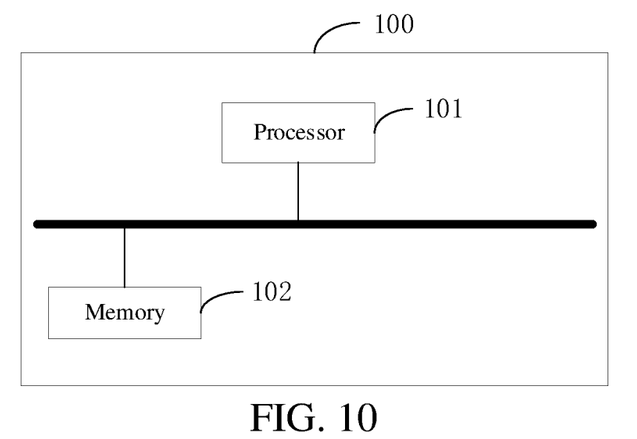
FIG. 10 is a schematic structural diagram of hardware of a flight controller according to an embodiment of the present invention.

FIG. 10 is a schematic structural diagram of hardware of a flight controller according to an embodiment of the present invention. The aircraft may include an electronic device such as a UAV or an unmanned spacecraft.

As shown in FIG. 10, the aircraft 100 includes one or more processors 101 and a memory 102. In FIG. 10, one processor 101 is used as an example.

The processor 101 and the memory 102 may be connected through a bus or in other manners, for example, connected through a bus in FIG. 10.

The memory 102, as a non-volatile computer-readable storage medium, may be configured to store a non-volatile software program, a non-volatile computer-executable program and a module. The processor 101 runs the non-volatile software program, instructions and the module stored in the memory 102, to implement various functional applications and data processing of a gimbal replacement method for an aircraft.

The memory 102 may include a high speed random access memory, and may further include a non-volatile memory, such as at least one magnetic disk storage device, a flash memory device or another non-volatile solid state storage device. In some embodiments, the memory 102 optionally includes memories remotely disposed relative to the processor 101, and these remote memories may be connected to the processor 101 through a network. Examples of the network include, but are not limited to, the Internet, an intranet, a local area network, a mobile communication network and a combination thereof.

The module is stored in the memory 102, the module, when performed by the one or more processors 101, performs the gimbal replacement method for an aircraft in any of the foregoing method embodiments.

Figure 11:
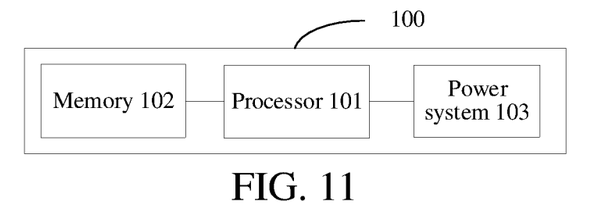
FIG. 11 is a connection block diagram of a flight controller according to an embodiment of the present invention.
Figure 12:
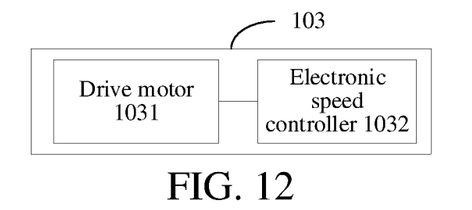
FIG. 12 is a schematic diagram of a power system in FIG. 11.

Referring to FIG. 11 and FIG. 12, the aircraft 100 further includes a power system 103. The power system 103 is configured to provide flight power for the aircraft. The power system 103 is connected to a processor 101. The power system 1403 includes: a drive motor 1031 and an electronic speed controller 1032. The electronic speed controller 1032 is electrically connected to the drive motor 1031 and is configured to control the drive motor 1031. Specifically, the electronic speed controller 1032 performs the gimbal replacement method for an aircraft based on the processor 101, generates a control instruction, and controls the drive motor 1031 by using the control instruction.

The aircraft 100 may perform the gimbal replacement method for an aircraft provided in Embodiment 1 of the present invention, and includes corresponding functional modules for performing the method and beneficial effects. For technical details not described in detail in aircraft embodiments, reference may be made to the gimbal replacement method for an aircraft provided in Embodiment 1 of the present invention.

Figure 13:
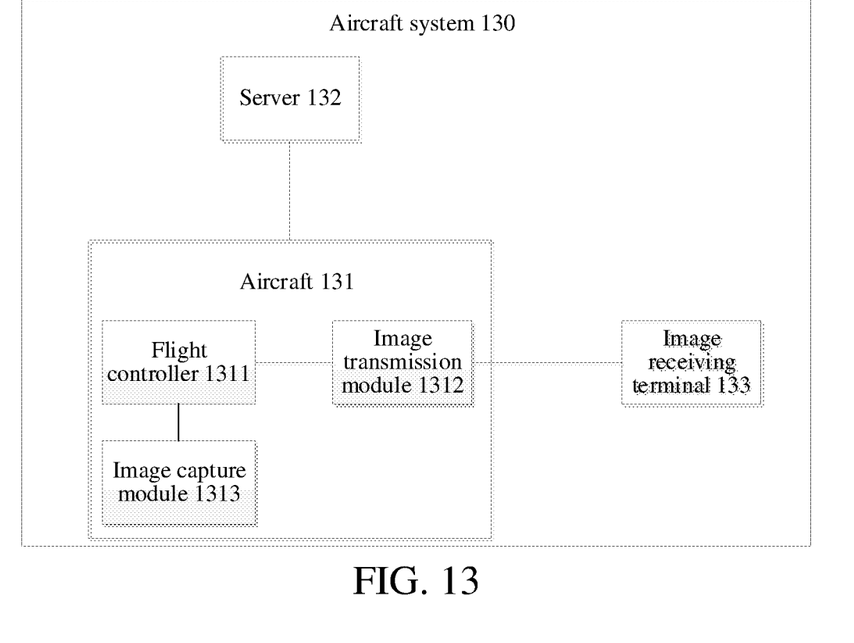
FIG. 13 is a schematic structural diagram of an aircraft system according to an embodiment of the present invention.

FIG. 13 is a schematic structural diagram of an aircraft system according to an embodiment of the present invention.

As shown in FIG. 13, an aircraft system 130 includes: an aircraft 131, a server 132, and an image receiving terminal 133. The aircraft 131 is communicatively connected to the server 132 and the image receiving terminal 133.

Specifically, the aircraft 131 includes: a flight controller 1311, an image transmission module 1312, and an image capture module 1313. The flight controller 1311 is communicatively connected to the image transmission module 1312 and the image capture module 1313.

In this embodiment of the present invention, the flight controller 1311, the image transmission module 1312, and the image capture module 1313 may all be integrated into an assembly of the aircraft, for example, integrated into a photographing assembly of the aircraft. The photographing assembly may be used as an image sending terminal, to transmit a captured image to the image receiving terminal through the image sending terminal in real time. The image receiving terminal 133 may be any type of user interaction device. The image receiving terminal 133 may be equipped with one or more types of different user interaction devices configured to acquire a user instruction or present or feed back information to a user. The interaction devices include, but are not limited to, a button, a display screen, a touchscreen, a speaker, and a remote control joystick. For example, the image receiving terminal 133 may be equipped with a touch display screen, and receive a touch instruction of the user through the touch display screen and present information, for example, present an image to the user through the touch display screen.

In some embodiments, the image receiving terminal 133 may be a smart terminal device such as a mobile phone, a tablet computer, a personal computer, a wearable device or the like. The image receiving terminal 133 may be equipped with a software APP matching the aircraft. The user may display a received image sent by the aircraft on the touch display screen by using the software APP.

In some other embodiments, the image receiving terminal 133 may further be a dedicated control device matching the aircraft, for example, a remote control of a UAV. The image receiving terminal 133 may receive an image from the UAV and display the image through a built-in or externally-connected display screen.

In this embodiment of the present invention, an aircraft system is provided, including the aircraft described above, a server, and an image receiving terminal. The aircraft includes a plurality of replaceable gimbals, a flight controller, an image capture module, and an image transmission module. The server is configured to store parameter data of the plurality of replaceable gimbals; and the image receiving terminal is configured to receive an image sent by the image transmission module. The costs can be reduced for a user by matching one aircraft with a plurality of replaceable gimbal cameras. In addition, the parameter data is stored in the gimbal camera, so that the parameter data can be quickly read for configuration after gimbal replacement, so that the aircraft is adapted to parameters of different gimbal cameras, to meet the shooting needs of different scenarios.

An embodiment of the present invention provides a computer program product, including a computer program stored in a non-volatile computer-readable storage medium, the computer program including program instructions, the program instructions, when executed by a computer, causing the computer to perform the foregoing gimbal replacement method for an aircraft, for example, perform the foregoing steps S10 to S30 of the method in FIG. 9.

An embodiment of the present invention further provides a non-volatile computer storage medium, the computer storage medium storing computer executable instructions, the computer executable instructions being executed by one or more processors, for example, one processor 101 in FIG. 10, so that the foregoing one or more processors can perform the gimbal replacement method for an aircraft in any of the foregoing method embodiments, for example, the steps shown in FIG. 9.

The foregoing described apparatus or device embodiments are merely examples. The unit modules described as separate parts may or may not be physically separate, and the parts displayed as module units may or may not be physical units, may be located in one location, or may be distributed on a plurality of network module units. Some or all of the modules may be selected according to actual requirements to implement the objectives of the solutions of the embodiments.

Based on the descriptions of the foregoing implementations, a person skilled in the art may clearly understand that the implementations may be implemented by software in addition to a universal hardware platform, or by hardware. Based on such an understanding, the foregoing technical solutions essentially or the part contributing to the related technology may be implemented in a form of a software product. The computer software product may be stored in a computer-readable storage medium, such as a ROM/RAM, a magnetic disk, or an optical disc, and includes several instructions for instructing a computer device (which may be a personal computer, a server, a network device or the like) to perform the methods described in the embodiments or some parts of the embodiments.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above, and these changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions; and these modifications or replacements will not cause the essence of corresponding technical solutions to depart from the scope of the technical solutions in the embodiments of the present application.

What is claimed is:

1. A replaceable gimbal camera, applicable to an aircraft, wherein the aircraft is provided with a fuselage and a gimbal, the gimbal is a replaceable gimbal, and the gimbal camera comprises:
    an image capture module, disposed on the gimbal and configured to capture an image;
    a static storage module, configured to store parameter data; and
    an image processing module, disposed on the fuselage, communicatively connected to the static storage module, and configured to read the parameter data stored in the static storage module, wherein after the gimbal is replaced, the image processing module is configured to read parameter data of a gimbal after the replacement and configure corresponding parameter data for an image capture module of the gimbal after the replacement;
    wherein the gimbal camera is provided with a mobile industry processor interface (MIPI), an inter-integrated circuit (I2C) bus interface, a first serial port, a second serial port, a scalable low voltage signaling embedded clock (SLVS-EC) serial interface, and a universal serial bus (USB) interface, and each gimbal comprises an MIPI, an I2C bus interface, a first serial port, a second serial port, an SLVS-EC serial interface and a USB interface.

2. The gimbal camera according to claim 1, wherein the image capture module comprises:
    a lens, disposed on the gimbal and configured to obtain an original image; and
    an image sensor, disposed on the gimbal, connected to the lens, and configured to convert the original image captured by the lens into a digital image signal.

3. The gimbal camera according to claim 1, wherein the parameter data is compressed into a gimbal parameter file, the gimbal parameter file is stored in the static storage module, and the image processing module is configured to read the parameter data in the gimbal parameter file by decompressing the gimbal parameter file.

4. The gimbal camera according to claim 1, wherein the static storage module is disposed on the gimbal, and each replaceable gimbal is provided with a static storage module configured to store parameter data, so that the gimbal camera reads the parameter data from the static storage module of the gimbal.

5. The gimbal camera according to claim 1, wherein the replaceable gimbal comprises an 8K gimbal, an 8K lens, and an 8K sensor, wherein the 8K lens and the 8K sensor are disposed on the 8K gimbal, the 8K sensor is communicatively connected to the image processing module through an MIPI line, and the gimbal camera controls an automatic focus of the 8K lens and an exposure of the 8K sensor through the I2C bus interface.

6. The gimbal camera according to claim 1, wherein the replaceable gimbal comprises a dual-light gimbal, an 8K visible light lens, an 8K visible light sensor, an infrared thermal imaging lens, and an infrared thermal imaging sensor, wherein the 8K visible light lens, the 8K visible light sensor, the infrared thermal imaging lens, and the infrared thermal imaging sensor are disposed on the dual-light gimbal, the infrared thermal imaging sensor is communicatively connected to the image processing module through a USB data line, and the gimbal camera controls a parameter of the infrared thermal imaging sensor through a second serial port line.

7. The gimbal camera according to claim 1, wherein the replaceable gimbal comprises a one-inch gimbal, a one-inch lens, and a one-inch sensor, wherein the one-inch lens and the one-inch sensor are disposed on the one-inch gimbal, the one-inch sensor is communicatively connected to the image processing module through an SLVS-EC serial bus, the gimbal camera controls an automatic focus and an automatic aperture of the one-inch lens through a second serial port line, and the gimbal camera controls movement of the one-inch gimbal through a first serial port line.

8. The gimbal camera according to claim 1, further comprising:
    an encoding module, disposed on the fuselage, connected to the image processing module, and configured to encode the image captured by the image capture module to generate an encoded image;
    a photographing and recording module, disposed on the fuselage and configured to take a picture and/or a video; and
    an image transmission module, disposed on the fuselage and configured to transmit the encoded image to an image receiving terminal.

9. The gimbal camera according to claim 1, wherein the parameter data comprises: a model of the gimbal camera, an image resolution, a frame rate, an image quality parameter, and a calibration parameter.

10. An aircraft, comprising:
a fuselage;
a plurality of replaceable gimbals, connected to the fuselage;
an arm, connected to the fuselage;
a power apparatus, disposed on the fuselage and/or the arm and configured to provide flight power for the aircraft;
a flight controller, disposed on the fuselage; and
a gimbal camera, comprising:
an image capture module, disposed on the gimbal and configured to capture an image;
a static storage module, configured to store parameter data; and
an image processing module, disposed on the fuselage, communicatively connected to the static storage module, and configured to read the parameter data stored in the static storage module, wherein after the gimbal is replaced, the image processing module is configured to read parameter data of a gimbal after the replacement and configure corresponding parameter data for an image capture module of the gimbal after the replacement;
wherein the gimbal camera is provided with a mobile industry processor interface (MIPI), an inter-integrated circuit (I2C) bus interface, a first serial port, a second serial port, a scalable low voltage signaling embedded clock (SLVS-EC) serial interface, and a universal serial bus (USB) interface, and each gimbal comprises an MIPI, an I2C bus interface, a first serial port, a second serial port, an SLVS-EC serial interface and a USB interface.

11. The aircraft according to claim 10, wherein the image capture module comprises:
a lens, disposed on the gimbal and configured to obtain an original image; and
an image sensor, disposed on the gimbal, connected to the lens, and configured to convert the original image captured by the lens into a digital image signal.

12. The aircraft according to claim 10, wherein the parameter data is compressed into a gimbal parameter file, the gimbal parameter file is stored in the static storage module, and the image processing module is configured to read the parameter data in the gimbal parameter file by decompressing the gimbal parameter file.

13. The aircraft according to claim 10, wherein the static storage module is disposed on the gimbal, and each replaceable gimbal is provided with a static storage module configured to store parameter data, so that the gimbal camera reads the parameter data from the static storage module of the gimbal.

14. The aircraft according to claim 10, wherein the gimbal camera further comprising:
an encoding module, disposed on the fuselage, connected to the image processing module, and configured to encode the image captured by the image capture module to generate an encoded image;
a photographing and recording module, disposed on the fuselage and configured to take a picture and/or a video; and
an image transmission module, disposed on the fuselage and configured to transmit the encoded image to an image receiving terminal.

15. An aircraft system, comprising:
the aircraft according to claim 10, wherein the aircraft comprises an image transmission module;
a server, configured to store parameter data of the plurality of replaceable gimbals; and
an image receiving terminal, configured to receive an image sent by the image transmission module.

16. A gimbal replacement method for an aircraft, applicable to the aircraft system according to claim 15, the method comprising:
pre-storing parameter data of a gimbal camera through each replaceable gimbal;
obtaining, after the gimbal is replaced, parameter data of a gimbal currently installed on the aircraft; and
configuring the parameter data for a lens and an image sensor of the aircraft.

17. The method according to claim 16, further comprising:
compressing the parameter data of the gimbal camera into a gimbal parameter file; and
sending the gimbal parameter file to the replaceable gimbal, so that the gimbal parameter file is stored in a static storage module of the replaceable gimbal.

18. The method according to claim 16, further comprising:
sending the parameter data of the gimbal camera to the server, so that the server stores the parameter data of the gimbal camera.

* * * * *